June 21, 1960
C W. MUSSER
2,941,835
PARACHUTE RELEASE CONNECTION
Filed June 26, 1957
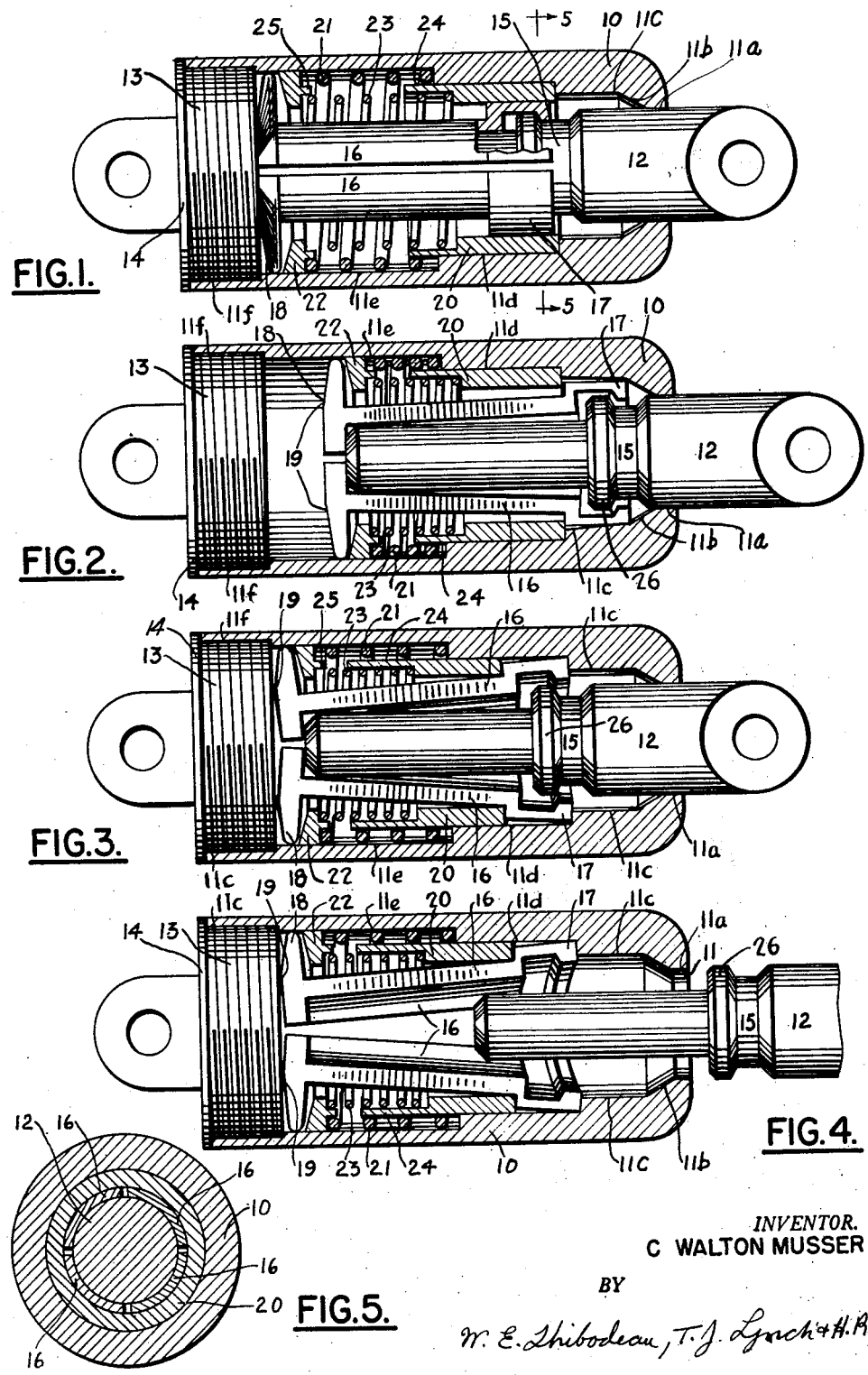
INVENTOR.
C WALTON MUSSER
BY

2,941,835

PARACHUTE RELEASE CONNECTION

C Walton Musser, Beverly, Mass., assignor to the United States of America as represented by the Secretary of the Army Filed June 26, 1957, Ser. No. 668,263

1 Claim. (Cl. 294—83)

(Granted under Title 35, U.S. Code (1952), sec. 266)

The invention described herein may be manufactured and used by or for the Government for governmental purposes without the payment of any royalty thereon.

This invention relates to a separable connection for automatically releasing a load when a major portion of the weight of said load is taken off the connection, thereby adapting such connection for use between a parachute and its load so that on reaching the ground the load will not be dragged needlessly by the parachute. One object is to increase the safety of such a connection to guard against the load being released upon only momentarily lightening such load. Another object is to simplify and facilitate the reinsertion of a load carrying pin within a housing of this connection after having been used.

Specifically, a load carrying pin is easily and quickly insertable in the housing of such a connection to be engaged and held by a number of jaw members which are closed on such pin by application of a load after reinsertion of the pin in the housing. The load is held against being prematurely released by the holding jaws upon their being clamped between the housing and a flange on the pin. Upon release of the load a spring moves the jaws longitudinally within the housing to a position where they are permitted to expand radially outward and be disengaged from the pin, yet still be within the housing.

Referring to the drawing,

Fig. 1 shows a longitudinal view partly in section of a connector embodying the present invention before load has been applied.

Fig. 2 shows the pin in its load carrying position.

Fig. 3 is a view in which the pin is in its load released position and is ready to be pulled out of the housing.

Fig. 4 shows the pin being reinserted within the housing after having once been used.

Fig. 5 is a section on the line 5—5 of Fig. 1.

The connection of the present invention (see Figs. 1 to 4) includes a housing 10 closed at one end and having a stepped bore open at the other end opening at 11. The portion 11a serves to guide a load carrying pin 12. The portion 11b is one constituting an abutment to hold the load with jaws in a load carrying position. The portion 11c is that in which the ends of the jaws are carried in the load carrying position as shown in Fig. 2. The portion 11d is of the size illustrated and is that in which clamping jaws are located when the load is released. Portion 11e is an enlarged part to accommodate a spring for actuating the jaws absorbing some of the shock on initial load application. The end portion 11f is threaded to receive the plug 13 having a flange 14 for limiting movement of the plug into the housing 10 in order that the plug may be in the correct position longitudinally for cooperation with the jaws.

The pin 12 provides a groove 15 and a flange 26 into which the hooked ends 17 of jaws 16 are adapted to be inserted for holding the pin in its load carrying position. At the opposite or inner end portion of the jaws 16 is a transverse flange 18. Adjacent its radial mid-portion this flange 18 is shaped to provide a pivot portion 19 for abutment upon the right face of the plug 13 in order that the jaw members 16 may be tilted for opening and closing. A jaw enclosing band 20 holds the jaws in a position of engagement with the pin in Fig. 1. A large spring 21 within the portion 11e in the housing cooperates with the housing at one end and with the transverse flange 18 at the other end through the medium of a ring 22, which transmits the force of the spring more nearly equally to all of the jaw members, there being four such members in the embodiment illustrated. A small spring 23 is weaker than the large spring and is located between the band 20 and the ring 22, band 20 having an extension 24 thereon for the purpose of insuring no convolutions of one spring interfere with those of the other spring. Another extension 25 is on the ring 22 for a similar purpose to extension 24.

In operation the parachute may be attached to either end of the connection although it is preferred that the parachute be secured to the plug 13 and the load to be carried attached by pin 12. Before carrying a load the pin, jaws, and band are in the position shown in Fig. 1. Upon the application of a load stress to the pin 12, the pin is moved part way out of the housing 10 to the position shown in Fig. 2 when the springs 21 and 23 are compressed and the hooked ends of the jaws continue to engage the flange 26. This is the position in which the load is carried during its descent with the parachute. Upon reaching the ground the weight of the load is released from pin 12 and the spring 21 acts through the ring 22 upon the flanges 18 of the jaw members causing the jaw members to be moved longitudinally from the position shown in Fig. 2 to that in Fig. 3. In moving to the position in Fig. 3 the jaws continue to hold the pin until they reach the enlarged portion 11d when the hooked ends 17 of the jaws come open far enough so that the pin is free to fall out. As the jaws are moved to the left under the spring 21 the pivot portions 19 of the flanges 18 engage the right face of the plug 13, stress is then applied by the spring through the ring 22 causing the jaws to open as soon as contact between the flange 18 and plug 13 takes place. During this movement, longitudinally, the jaws cause the band 20 to be slid to the left by direct engagement of the forward end of band 20 by shoulder portions of said jaws as shown in Figs. 2 to 4 of the drawing, compressing the small spring 23. Upon release of the pin 12 and its disconnection from the housing and parachute the load carried by the parachute is not likely to be dragged along the ground. While the load carrying pin 12 is removed from the housing the jaws and springs remain in position as shown in Figs. 3 and 4. When the pin is to be reinserted for reuse in the housing then the left end of the pin engages the radially inner portion of the flanges 18 and causes the hooked end portion of the jaws to tilt and to engage the flange 26 on the pin. As soon as this takes place the small spring 23 slides the band 20 to right from the position shown in Fig. 4 to that shown in Fig. 1. Movement of the band 20 to the right is stopped by the abutment wall illustrated in Fig. 2.

Among the advantages of this invention may be mentioned that as long as the jaw members 16 are carried within the housing at all times there is less likelihood that the load may be accidentally and prematurely released since the jaws must slide longitudinally a substantial distance before they can open wide enough for the load carrying pin to be released by them. Another advantage of this invention is the ease and simplicity with which the pin 12 may be reinserted in the housing to be engaged by the jaws without any complicated or difficult movements of compressing the jaws, it being simply necessary to have the left end of the pin engage the radially inner portions of the transverse flanges 28 and cause the jaws to tilt or move about their pivot portions 19 in being closed by the thrust on the pin and their end portions coming into the groove 15, accompanied by a sliding movement of the band 20 as soon as the jaws are compressed or closed sufficiently to allow band 20 to be over them.

I claim:

A parachute release connection having a housing, said housing having an inner or rear end at least partially closed by a wall and the opposite outer or forward end open, at least a three-stepped bore of decreasing diameter toward the open end, a pin insertable in said housing through its open end, jaw members radially between the pin and the housing, said jaw members having hooked outer ends for holding the pin and a load carried thereby, said jaw members having radially outward and radially inward extending projections adjacent the inner end portion, pivot portions on longitudinally inner end portions of the jaw members, a flange on the pin engaged by said hooked ends of the jaw members, a spring in a largest diametered and innermost bore of the housing cooperating with the housing at its inner end and with said jaw members for moving the jaw members rearwardly away from the open end of the housing on release of a load, a shiftable band located circumferentially in an intermediate bore of the housing, a ring member cooperating with an inner end of said spring and with said radially outward extending portions of said jaw members for opening said jaw members by sliding said jaw members longitudinally inwardly and tilting the same about said pivot portions on engagement with the inner end wall of said housing, a lighter spring than that previously mentioned engaging said ring member and shiftable band for moving said shiftable band forwardly and outwardly after said jaw members have been closed on said pin and its flange, the radially inward extending longitudinally inner portions of said jaw members being engageable by said pin on its being moved fully inwardly, causing said jaws to close on said pin by a pivotal movement of each jaw member about its pivot portion on the longitudinally inner end of the jaw members on their engagement with said inner end wall, said first mentioned spring being strong enough to support at least the weight of said pin, jaws, ring, and band, whereby the pin is retained in the housing without a load being attached thereto, and a third bore of the housing being of a still smaller diameter into which said jaw members are shifted forwardly by application of a load to the pin, an outer wall of said third bore being of smallest diameter and being tapered for holding said hooked ends of the jaw members in engagement with said flange on said pin during application of load, said jaw members each having a shoulder portion adjacent to but in rear of the hooked end, upon release of the load the first mentioned and stronger spring moving the ring member rearwardly and the jaws moving the band rearwardly compressing the lighter spring by said shoulder portions engaging a forward end of said shiftable band allowing the jaw members to expand into said intermediate bore formerly occupied by said band when in its forwardmost position, said jaw members being pivotally and radially expandable to an amount sufficient to allow the pin and its flange to be withdrawn through the open end of the housing.

References Cited in the file of this patent

UNITED STATES PATENTS

| | | |
|---|---|---|
| 2,153,077 | Clarke | Apr. 4, 1939 |
| 2,478,019 | Sonntag | Aug. 2, 1949 |
| 2,521,516 | Heidman et al. | Sept. 5, 1950 |
| 2,729,495 | Dejean | Jan. 3, 1956 |